United States Patent
Haubrich (12)

(10) Patent No.: US 6,671,332 B1
(45) Date of Patent: Dec. 30, 2003

(54) ZERO IF RECEIVER WITH REDUCED AM DETECTOR

(75) Inventor: Gregory J. Haubrich, Champlin, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 09/415,693

(22) Filed: Oct. 8, 1999

(51) Int. Cl.[7] .............. H03D 3/00; H03D 3/22

(52) U.S. Cl. .......... 375/334; 375/335; 375/332

(58) Field of Search ............ 375/334, 335, 375/322, 316; 455/293, 324; 435/209

(56) References Cited

U.S. PATENT DOCUMENTS

| | | | |
|---|---|---|---|
| 4,993,048 A | | 2/1991 | Williams et al. |
| 5,095,536 A | * | 3/1992 | Loper .......... 455/324 |
| 5,584,068 A | | 12/1996 | Mohindra |
| 5,870,669 A | * | 2/1999 | Kawai .......... 435/209 |
| 2002/0155822 A1 | * | 10/2002 | Adachi .......... 455/293 |

OTHER PUBLICATIONS

U.S. patent application SN 09/302,932 filed Apr. 30, 1999 by Villaseca, entitled "Telemetry System for Implantable Medical Devices".

* cited by examiner

Primary Examiner—Stephen Chin
Assistant Examiner—Sam K. Ahn
(74) Attorney, Agent, or Firm—Girma Wolde-Michael; Daniel G. Chapik

(57) ABSTRACT

A circuit for providing phase shifted I and Q output signals from a received FSK modulated signal and the method of its operation. The circuit includes apparatus for receiving an FSK modulated signal, first, second and third mixers, to which the received FSK modulated signal is applied, a local oscillator, generating an oscillator signal and phase shifters providing first, second and third phase shifted versions of the oscillator signal to the first, second and third mixers to produce first, second and third mixer output signals which are likewise phase shifted. The mixer output signals are provided to summing circuits providing an I output signal corresponding to the difference between the first and second mixer output signals a Q output signal corresponding to the difference between the second and third mixer output signals. The second version of the oscillator signal may be shifted 90 degrees relative to the first version of the oscillator signal and the third version of the oscillator signal may be shifted 90 degrees relative to the second version of the oscillator signal. Preferably the first, second and third mixers are all fabricated on the same integrated circuit chip.

5 Claims, 1 Drawing Sheet

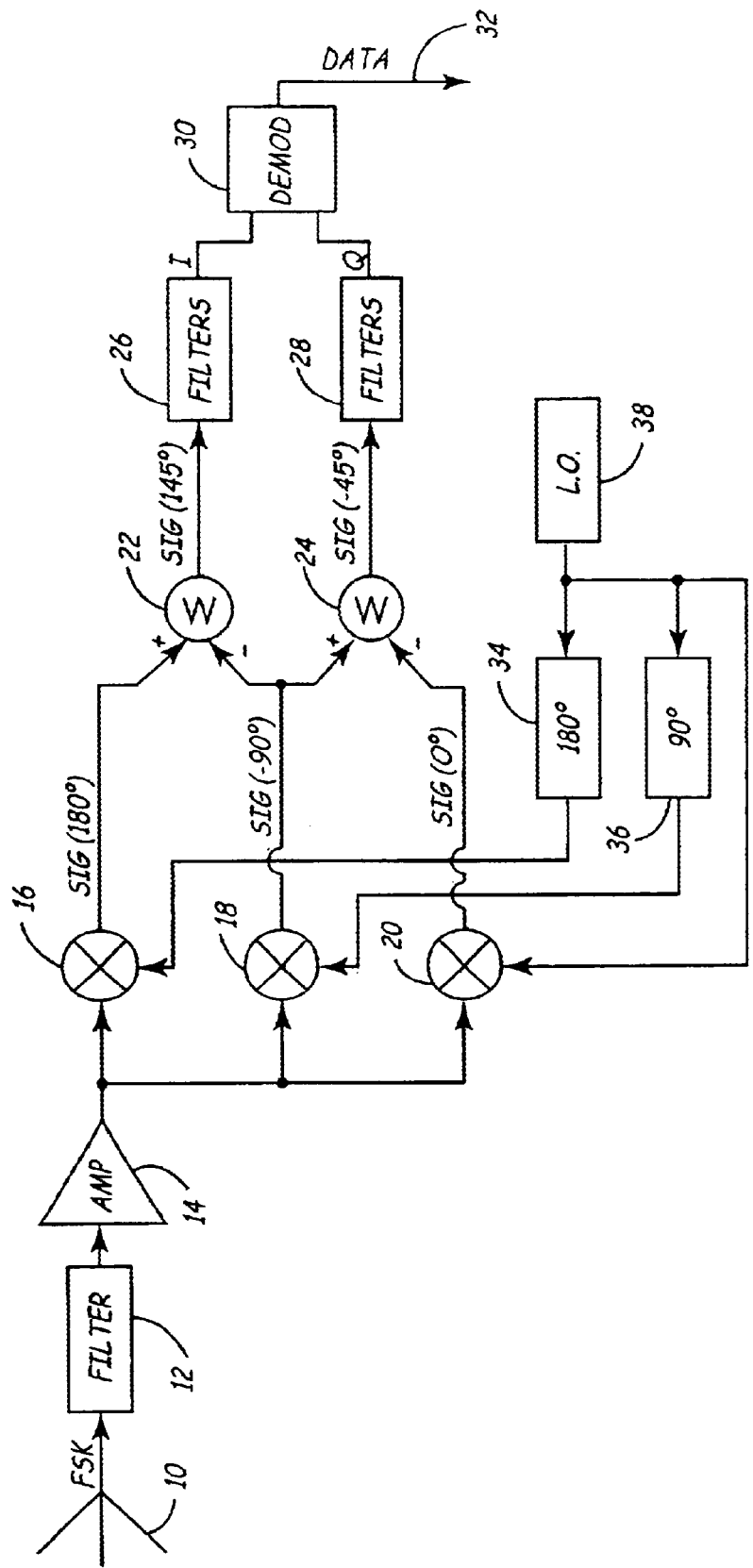

ZERO IF RECEIVER WITH REDUCED AM DETECTOR

BACKGROUND OF THE INVENTION

This invention relates to demodulation of phase/frequency-modulated data generally and more particularly to zero intermediate frequency receivers.

Zero intermediate frequency (zero IF) receivers, also referred to as "direct conversion" receivers typically employ a local oscillator operating at the carrier frequency of the received RF signal, coupled to a pair of quadrature related mixers to mix down the received RF signal to two quadrature related signals (I and Q), which may the be decoded or demodulated into a digital data stream. Such receivers are often employed as digital paging receivers or transceivers using an FSK (Frequency Shift Keying) modulation scheme, and may also be employed as cordless telephone transceivers. Recently, as described in U.S. patent application Ser. No. 09/302,932 for a "Telemetry System for Implantable Medical Devices", filed Apr. 30, 1999 by Villaseca et al, incorporated herein by reference in its entirety, such transceivers may also be employed as telemetry transceivers in implantable medical devices such as pacemakers, defibrillators and the like.

Typically zero IF receivers either provide phase shifted versions of the received signal to the mixers, where the signals are mixed with the local oscillator signal to provide I and Q output signals which are 90 degrees out of phase with one another or provide the received signal in phase to both of the two mixers, where the received signals are mixed with phase shifted versions of the local oscillator signal to provide corresponding I and Q output signals. Examples of these two basic circuit geometries are illustrated in U.S. Pat. No. 5,584,068 and U.S. Pat. No. 4,993,048. While receivers of these types have proven themselves to be extremely useful over a wide range of applications, AM (Amplitude Modulation) rejection remains a significant weakness. In particular, in such receivers employing balanced mixers, an imbalance in the mixer diodes or a DC offset between the mixers can lead to AM detection.

SUMMARY OF THE INVENTION

The present invention is intended to provide a zero IF receiver having improved AM rejection capabilities. The invention accomplishes this result by means of a receiver circuit, which employs three mixers, rather than the traditional pair of mixers as described above. The three mixers are preferably all located on the same integrated circuit chip. The received signal is input in phase to all three mixers where the received signal are mixed down with local oscillator signals phase shifted by 0°, -90°, and 180° to provide three phase shifted mixer output signals at the baseband frequency. The mixer output signals are provided to two summing circuits, which take differences between the signals to produce I, and Q baseband frequency signals shifted 90° relative to one another. Because the received signals are provided to the mixers in phase, assuming the mixers are on the same chip and thus nearly identical, the AM detection by each mixer should correspondingly be nearly identical. As a result, when differences between the signals are taken in the summing circuits, the common AM signals should nearly cancel, improving AM rejection and increasing the linearity of the mixer circuit.

BRIEF DESCRIPTION OF THE DRAWING

FIG. 1 illustrates an exemplary receiver circuit according to the present invention.

DETAILED DESCRIPTION OF THE PREFERRED EMBODIMENT

FIG. 1 is a functional schematic illustrating a receiver according to the present invention. All components other than the antenna are preferably fabricated as part of a single integrated circuit chip. Antenna 10 is tuned to receive signals centered on a carrier frequency which may be, for example in the vicinity of 900 MHz in the case of a paging transceiver or, as discussed in the above-cite Villaseca application, in the vicinity of 400 MHz in the case of a transceiver employed in an implantable medical device. The RF signal may be modulated by a frequency deviation, for example, of plus or minus 4 KHz (the baseband frequency) above or below the carrier frequency. The received FSK signal may be passed through a bandpass filter 12, amplified by amplifier 14 and the provided in phase to mixers 16, 18 and 20. Mixers 16, 18 and 20 are balanced mixers, preferably all located on the same integrated circuit chip and thus nearly identical.

Local oscillator 38, which may take the form of a phase locked loop frequency synthesizer, provides an oscillator signal at the carrier frequency. The oscillator signal is directly applied to mixer 20, but is phase shifted by -90° by phase shifter 36 before being provided to mixer 18 and is phase shifted by 1800 by phase shifter 34 before being provided to mixer 16. Alternatively, a differential output of the local oscillator 38 may be employed to provide the 180° shifted oscillator signal. Mixers 20, 18 and 16 thus provide mixer output signals at the baseband frequency, shifted 0°, -90° and 180° degrees relative to one another. Because the mixers are nearly identical, the AM signal components of the mixer output signals are correspondingly also nearly identical.

The difference between the -90° and 0° phase shifted mixer output signals is taken by summing circuit 24 to provide a -45° phase shifted signal which, after band pass/low pass filtration by filters 28, serves as the Q output signal, applied to demodulator 30. The AM components of the mixer output signals should almost completely cancel out, providing enhanced AM rejection. Similarly, the difference between the 180° and -90° phase shifted mixer output signals is taken by summing circuit 22 to provide a +45° phase shifted signal which, after bandpass filtration by filters 26, serves as the I output signal, applied to demodulator 30. The AM components of the mixer output signals should likewise almost completely cancel out, providing enhanced AM rejection. Demodulator 30 may correspond to any of the demodulators typically employed in Zero IF receivers, and provides a digital data output 32 corresponding to the data employed to modulate the carrier signal of the received FSK signal.

While the invention is described as embodied in a zero-IF RF receiver, and it is believed that such an embodiment of the invention is particularly desirable, it should be understood that the mixer circuit of the invention is also believed useful in other applications, including hard-wired telemetry system, transceivers employing transmission mediums other than RF signals and in any circuits employing a mix-down scheme to derive I and Q signals from FSK modulated input signals.

In conjunction with the above disclosure, I claim:
1. A circuit for providing phase shifted I and Q output signals from a received FSK modulated signal, comprising:
   means for receiving an FSK modulated signal;
   first, second and third mixers, coupled to receive the FSK modulated signal in phase from the receiving means;
   a local oscillator, generating an oscillator signal;

phase shifting means coupled to the oscillator, for providing first, second and third versions of the oscillator signal, the second version of the oscillator signal being phase shifted from the first version of the oscillator signal, the third version of the oscillator signal likewise being phase shifted from the second version of the oscillator signal, the first second and third versions of the oscillator signal each being provided to one of the first, second and third mixers to produce first, second and third mixer output signals which are likewise phase shifted;

a first summing circuit coupled to receive the first and second mixer output signals and providing an I output signal corresponding to the difference between the first and second mixer output signals; and a second summing circuit coupled to receive the second and third mixer output signals and providing a Q output signal corresponding to the difference between the second and third mixer output signals.

2. The circuit of claim 1 wherein the phase shifting means comprises means for shifting the second version of the oscillator signal 90 degrees relative to the first version of the oscillator signal and means for shifting the third version of the oscillator signal 90 degrees relative to the second version of the oscillator signal.

3. The circuit of claim 1 or claim 2 wherein the first, second and third mixers are all fabricated on the same integrated circuit chip.

4. A method of providing phase shifted I and Q output signals from a received FSK modulated signal, comprising:

generating an oscillator signal;

providing first, second and third versions of the oscillator signal, the second version of the oscillator signal being phase shifted from the first version of the oscillator signal, the third version of the oscillator signal likewise being phase shifted from the second version of the oscillator signal;

receiving an FSK modulated signal;

mixing the first, second and third versions of the oscillator signal, with the received FSK modulated signal to produce first, second and third mixer output signals which are phase shifted relative to one another;

summing the first and second mixer output signals and providing an I output signal corresponding to the difference between the first and second mixer output signals; and summing the second and third mixer output signals and providing a Q output signal corresponding to the difference between the second and third mixer output signals.

5. The method of claim 4 wherein providing first, second and third versions of the oscillator signal comprises shifting the second version of the oscillator signal 90 degrees relative to the first version of the oscillator signal and means for shifting the third version of the oscillator signal 90 degrees relative to the second version of the oscillator signal.

* * * * *

UNITED STATES PATENT AND TRADEMARK OFFICE
CERTIFICATE OF CORRECTION

PATENT NO. : 6,671,332 B1  
DATED : December 30, 2003  
INVENTOR(S) : Gregory J. Haubrich It is certified that error appears in the above-identified patent and that said Letters Patent is hereby corrected as shown below:

<u>Title page,</u>  
Item [54], Title, delete "DETECTOR" and insert -- DETECTION --.

Signed and Sealed this

Eleventh Day of January, 2005

JON W. DUDAS  
*Director of the United States Patent and Trademark Office*